(12) United States Patent
Watanobe et al.

(10) Patent No.: US 10,160,083 B2
(45) Date of Patent: Dec. 25, 2018

(54) METHOD FOR MANUFACTURING CUBIC BORON NITRIDE CUTTING TOOL AND CUBIC BORON NITRIDE CUTTING TOOL

(71) Applicant: SUMITOMO ELECTRIC HARDMETAL CORP., Itami-shi, Hyogo (JP)

(72) Inventors: Naoki Watanobe, Itami (JP); Katsumi Okamura, Itami (JP); Hiroki Yonekura, Itami (JP); Yosuke Korogi, Kishima-gun (JP)

(73) Assignee: SUMITOMO ELECTRIC HARDMETAL CORP., Itami-shi (JP)

( * ) Notice: Subject to any disclaimer, the term of this patent is extended or adjusted under 35 U.S.C. 154(b) by 196 days.

(21) Appl. No.: 14/415,496

(22) PCT Filed: Dec. 27, 2013

(86) PCT No.: PCT/JP2013/085028
§ 371 (c)(1),
(2) Date: Jan. 16, 2015

(87) PCT Pub. No.: WO2014/155890
PCT Pub. Date: Oct. 2, 2014

(65) Prior Publication Data
US 2015/0202730 A1    Jul. 23, 2015

(30) Foreign Application Priority Data

Mar. 29, 2013 (JP) .................................. 2013-071821

(51) Int. Cl.
| | | |
|---|---|---|
| *B23B 27/18* | (2006.01) | |
| *B23B 27/14* | (2006.01) | |
| *B24B 3/34* | (2006.01) | |

(52) U.S. Cl.
CPC .............. *B24B 3/34* (2013.01); *B23B 27/145* (2013.01); *B23B 27/18* (2013.01);
(Continued)

(58) Field of Classification Search
CPC ..... Y10T 407/26; Y10T 407/27; B23B 27/14; B23B 27/141; B23B 27/148; B23B 27/18;
(Continued)

(56) References Cited

U.S. PATENT DOCUMENTS 2,164,303 A * 7/1939 Berg ..................... B23B 27/005
                                                  29/90.01
3,187,406 A * 6/1965 Franko ................ B23B 27/1618
                                                  407/114

(Continued)

FOREIGN PATENT DOCUMENTS

| CN | 101568405 A | 10/2009 |
|---|---|---|
| DE | 3902612 A1 | 8/1989 |

(Continued)

OTHER PUBLICATIONS

JP 08-155702 (Translation) obtained at https://dossier1.j-platpat.inpit.go.jp/tri/all/odse/ODSE_GM101_Top.action (last visited Oct. 12, 2017).*

(Continued)

*Primary Examiner* — Ryan Rufo
(74) *Attorney, Agent, or Firm* — Oliff PLC

(57) ABSTRACT

A method for manufacturing a cubic boron nitride cutting tool including a base metal and sintered cubic boron nitride compact at a corner portion of the base metal, capable of improving the accuracy of the center height and reducing the angle of inclination or width of a negative rake face; and the cubic boron nitride cutting tool. The method includes grinding the compact by pressing it against an end face of a grindstone of a grinder to form flank and rake faces on the (Continued)

compact while the base metal of the cutting tool is held by a chuck of the grinder, so that the compact is substantially ground. The rake face is formed to be recessed from a top face of the base metal or only a portion of the compact that protrudes from a base-metal rake face is ground while the tool is continuously held by the chuck.

4 Claims, 8 Drawing Sheets

(52) U.S. Cl.
CPC . *B23B 2200/049* (2013.01); *B23B 2200/0447* (2013.01); *B23B 2200/085* (2013.01); *B23B 2200/242* (2013.01); *B23B 2200/283* (2013.01); *B23B 2222/28* (2013.01); *B23B 2226/125* (2013.01); *Y10T 407/24* (2015.01)

(58) Field of Classification Search
CPC ............... B23B 27/20; B23B 2226/12; B23B 2226/125; B23B 2226/31; B23B 2226/315
See application file for complete search history.

(56) References Cited

U.S. PATENT DOCUMENTS

| | | | | |
|---|---|---|---|---|
| 3,947,937 | A * | 4/1976 | Hertel | B23B 27/143 407/114 |
| 4,044,439 | A * | 8/1977 | Romagnolo | B23B 27/143 407/114 |
| 4,059,363 | A * | 11/1977 | Romagnolo | B23B 27/143 407/114 |
| 4,159,885 | A * | 7/1979 | Schott | B23B 27/143 407/114 |
| 4,561,810 | A * | 12/1985 | Ohno | B23B 27/145 407/114 |
| 4,606,679 | A * | 8/1986 | Jeremias | B23B 27/143 407/114 |
| 4,854,784 | A * | 8/1989 | Murray | B23B 27/141 407/114 |
| 5,246,315 | A * | 9/1993 | Hansson | B23B 5/12 407/114 |
| 5,709,907 | A * | 1/1998 | Battaglia | B23B 27/146 427/126.1 |
| 5,722,803 | A * | 3/1998 | Battaglia | B23B 27/146 407/115 |
| 5,810,520 | A * | 9/1998 | Hintze | B23B 27/143 407/114 |
| 6,050,752 | A * | 4/2000 | DeRoche | B23C 5/202 407/114 |
| 6,161,990 | A * | 12/2000 | Oles | B23B 27/145 407/113 |
| 6,171,031 | B1 * | 1/2001 | LaFlamme | B23B 27/141 407/114 |
| 6,315,502 | B1 * | 11/2001 | Maurer | B23B 27/141 407/118 |
| 6,422,931 | B1 * | 7/2002 | Laflamme | B23C 5/202 451/231 |
| 6,612,786 | B1 | 9/2003 | Kanada et al. | |
| 7,520,701 | B2 * | 4/2009 | Kukino | B23B 27/145 407/113 |
| 7,687,156 | B2 * | 3/2010 | Fang | B22F 7/062 407/119 |
| 7,765,902 | B2 * | 8/2010 | Kuroda | B23B 27/145 407/113 |
| 7,771,847 | B2 * | 8/2010 | Kukino | B23B 27/141 407/119 |
| 2002/0131832 | A1 * | 9/2002 | Morsch | B23B 27/045 407/118 |
| 2002/0146292 | A1 * | 10/2002 | Shimizu | B23B 27/145 407/113 |
| 2008/0025802 | A1 * | 1/2008 | Kukino | B23B 27/145 407/42 |
| 2008/0254282 | A1 * | 10/2008 | Kukino | B23B 27/141 428/336 |
| 2010/0272527 | A1 * | 10/2010 | Webb | B23B 27/141 407/118 |
| 2012/0055099 | A1 * | 3/2012 | Bao | B01J 3/062 51/309 |
| 2012/0230785 | A1 * | 9/2012 | Chen | B23B 27/141 407/114 |
| 2015/0043981 | A1 * | 2/2015 | Nagami | B23C 5/06 407/113 |
| 2015/0321262 | A1 * | 11/2015 | Kondameedi | B23B 27/005 407/115 |

FOREIGN PATENT DOCUMENTS

| | | | | |
|---|---|---|---|---|
| EP | 1291131 | A1 | 3/2003 | |
| EP | 1741505 | A1 * | 1/2007 | ........... B23B 27/141 |
| GB | 2022476 | A * | 12/1979 | ........... B23B 27/145 |
| JP | 54073390 | A * | 6/1979 | ............. B23B 27/14 |
| JP | 62-271606 | A * | 11/1987 | ............. B23B 27/22 |
| JP | 62271606 | A * | 11/1987 | ............. B23B 27/22 |
| JP | 01-171705 | A * | 7/1989 | ............. B23B 27/14 |
| JP | 01171705 | A * | 7/1989 | ............. B23B 27/14 |
| JP | 01252307 | A * | 10/1989 | ............. B23B 27/14 |
| JP | H04-193404 | A | 7/1992 | |
| JP | 08118113 | A * | 5/1996 | ............. B23B 27/22 |
| JP | 08-155702 | A * | 6/1996 | ............. B23B 27/22 |
| JP | 08155702 | A * | 6/1996 | ............. B23B 27/22 |
| JP | 10180508 | A * | 7/1998 | ............. B23B 27/20 |
| JP | 2000107912 | A * | 4/2000 | ............. B23B 27/20 |
| JP | 2001-009606 | A | 1/2001 | |
| JP | 2001347405 | A * | 12/2001 | ............. B23B 27/22 |
| JP | 2002-307210 | A | 10/2002 | |
| JP | 2003-175408 | A | 6/2003 | |
| JP | 2003340615 | A * | 12/2003 | ............. B23B 27/18 |
| JP | 2004-001105 | A | 1/2004 | |
| JP | 2004-223648 | A | 8/2004 | |
| JP | 2004345028 | A * | 12/2004 | ............. B23B 27/14 |
| JP | 2005-088178 | A | 4/2005 | |
| JP | 2006341321 | A * | 12/2006 | ............. B23B 27/22 |
| JP | 2007190633 | A * | 8/2007 | ............. B23B 27/22 |
| JP | 2007290059 | A * | 11/2007 | ............. B23B 27/14 |
| JP | 2008-207312 | A * | 9/2008 | ............. B23B 27/22 |
| JP | 2011-045955 | A | 3/2011 | |
| WO | WO 2013/161558 | A1 * | 10/2013 | ........... B23B 27/145 |

OTHER PUBLICATIONS

Nov. 10, 2015 Office Action issued in Japanese Patent Application No. 2014-065917.
Jun. 3, 2016 Office Action issued in Chinese Patent Application No. 2013-80040327.5.
Feb. 4, 2014 International Search Report issued in International Application No. PCT/JP2013/085028.

* cited by examiner

METHOD FOR MANUFACTURING CUBIC BORON NITRIDE CUTTING TOOL AND CUBIC BORON NITRIDE CUTTING TOOL

TECHNICAL FIELD

The present invention relates to a method for manufacturing a cubic boron nitride cutting tool including a small piece of a sintered cubic boron nitride compact disposed at a corner portion of a base metal and a cutting edge formed at the sintered cubic boron nitride compact and also relates to the cubic boron nitride cutting tool, more specifically, to a method for manufacturing a cubic boron nitride cutting tool including devised finish grinding and to the cubic boron nitride cutting tool.

BACKGROUND ART

Examples of a cutting tool (cutting insert) include a cubic boron nitride cutting tool formed by, for example, joining a small piece of a sintered cubic boron nitride compact to a corner portion of a polygonal base metal, made of a material such as cemented carbide, ceramics, cermet, or sintered alloy, and forming a cutting edge at the sintered cubic boron nitride compact.

The cubic boron nitride cutting tool that does not include a breaker protrusion or a breaker groove is finished in such a manner that the top face of the base metal and the rake face formed on the sintered cubic boron nitride compact are flush with each other. Cuttings using a cubic boron nitride tool include various applications, each requires appropriate edge processing. In the case where the sharpness is required, cutting is performed using a tool having a sharp edge or a tool having a honed edge. In the case where the strength is required, cutting, is frequently performed using a tool including a sintered cubic boron nitride compact, which is hard and fragile, on which a cutting edge is formed while a negative rake face is formed at the cutting edge to strengthen the cutting edge.

Usually, to form a rake face by grinding, a large number of cutting, tools are attached to a flat grinder and ground by a single grindstone. In this method, the base metal and the sintered cubic boron nitride compact disposed at a corner portion of the base metal are ground together (simultaneously ground) and thus, the top face of the base metal and the rake face of the sintered cubic boron nitride compact become flush with each other. Another conceivable method is to simultaneously grind the base metal and the sintered cubic boron nitride compact together to form only the flank face by finishing only the base metal or the rake face by grinding and then soldering a cubic boron nitride blank thereto.

A cubic boron nitride cutting tool in which the top face of the base metal and the rake face of the sintered cubic boron nitride compact are flush with each other is disclosed by, for example, Patent Literature (PTL) 1. Such cubic boron nitride cutting tools are also described in catalogues disclosed through the Internet by various tool manufacturers (for example, Sumitomo Electric Hardmetal Corporation, Tungaloy Corporation, Mitsubishi Materials Corporation, or Sandvik AB).

CITATION LIST

Patent Literature

PTL 1: Japanese Unexamined Patent Application Publication No. 2011-045955

SUMMARY OF INVENTION

Technical Problem

In the method of simultaneously grinding the sintered cubic boron nitride compact and the top face of the base metal to form a rake face, materials having different hardness are simultaneously processed and the area over which the faces are ground is large. Thus, the grindstone is inevitably loaded with chips or inevitably comes into contact with the compact and the base metal at one side (in an uneven manner) due to shaking, whereby the ground surface becomes shear-drooped and the flatness of the rake face near the edge decreases. Even in the case where only the base metal is ground, it is difficult to have a flat ground surface since the surface has a large area.

The true center height of a typical turning tool (a processed point of a tool) varies due to the tolerance in thickness of the tool body (most strictly, ±25 µm). Also in the case of a turning tool having a negative rake face at the cutting edge, the center height varies to a larger extent due to the angle of inclination, the width, or the processing accuracy of the negative rake face.

Particularly in processing of the periphery of a small-diameter pole member or processing of a small-diameter hole, it is extremely important to improve the accuracy of the center height since the center height decides the processing accuracy. Existing cubic boron nitride cutting tools do not truly respond to the demand.

For example, a cubic boron nitride cutting tool used for finishing is required to reduce the angle of inclination of the negative rake face and the width of the negative rake face in view of the sharpness. In the case where the sharpness is to be enhanced further, a cubic boron nitride cutting tool is required to have a sharp edge without having a negative rake face or to have an edge formed only by honing.

In contrast with the demand, in existing cubic boron nitride cutting tools in which the sintered cubic boron nitride compact and the top face of the base metal are ground together to form a rake face, the width of the negative rake face vary, among the tools that meet the same specifications, within ±25 µm in the case where the angle of inclination of the negative rake face is, for example, 15° or within ±40 µm in the case where the angle of inclination of the negative rake face is 10° due to effects such as of edge dullness of the rake face.

If the width of the negative rake face varies, the center height also varies among the tools. Thus, the center height is adjusted by being corrected after tentatively grinding a workpiece. This adjustment is extremely troublesome for users of the tool.

The width or the height of the negative rake face has to exceed the range of the accuracy tolerance at grinding. Thus, the negative rake face becomes larger than necessary and further reducing the angle of inclination of the negative rake face becomes difficult, affecting the sharpness.

As described above, the negative rake face is occasionally enlarged for purposes of use. In addition, the negative rake face is enlarged for the following reason. In an existing technology, an edge is sometimes chipped during processing of the flank face since the flank face is formed by grinding after the sintered cubic boron nitride compact and the top fire of the base metal are ground together to form the rake face. Thus, the negative rake face has to be enlarged to allow for the removal of the chipped portion.

This invention aims to provide a cubic boron nitride cutting tool including a sintered cubic boron nitride compact at a corner of a base metal, the tool having a highly accurate center height and having an edge that is more flexibly processible (the angle of inclination or the width of a negative rake face can be sufficiently reduced).

Solution to Problem

To solve the above-described problems, the present invention provides a method for manufacturing a cubic boron nitride cutting tool described below.

The method for manufacturing a cubic boron nitride cutting tool includes grinding a sintered cubic boron nitride compact disposed at a corner of a base metal by pressing the sintered cubic boron nitride compact against an end face of a grindstone of a grinder, whose position and orientation are controllable, to form a flank face and a rake face on the sintered cubic boron nitride compact while the base metal of the cubic boron nitride cutting tool is tightly held by a chuck of the grinder in a direction of a thickness of the cubic boron nitride cutting tool.

The grinding is performed in such a manner that the sintered cubic boron nitride compact is substantially ground. In the grinding to form the rake face, the rake face is formed so as to be recessed from a top face of the base metal (base-metal rake face) or only a portion of the sintered cubic boron nitride compact that protrudes from a base-metal rake face is ground. The above-described grinding is performed while the tool is continuously held by the chuck by adjusting the orientation and the position of the chuck.

Here, as to the expression of "the grinding is performed in such a manner that the sintered cubic boron nitride compact is substantially ground", the area that is ground to form the rake face may extend over part of the base metal as long as the area is sufficiently small as to keep the flatness without causing adverse effects of simultaneous grinding. Part of the base metal that is pound in such a situation is not regarded as the ground area. This is the intended meaning of the above expression.

A cubic boron nitride cutting tool according to the invention is a cubic boron nitride cutting tool that includes a sintered cubic boron nitride compact at a corner portion of a cemented carbide base metal, the compact having a flank face and a rake face. The flank face has grinding streaks perpendicular to a direction of a thickness of the tool, the rake face has grinding streaks that are approximately perpendicular to a bisector of a corner of the tool at which the sintered cubic boron nitride compact is disposed. The rake face is formed so as to be recessed from a top face of the base metal so that a step is formed between the rake face and the top face of the base metal.

Advantageous Effects of Invention

In the manufacturing method of the invention, the flank face and the rake face are formed by grinding using a single chuck. The use of a single chuck prevents positional displacement of the tool that would otherwise occur due to changing the chuck to another. In addition, since grinding to form the rake face is performed in such a manner that the sintered cubic boron nitride compact is substantially ground, the rake face is prevented from being edge-dulled unlike in the case where the base metal is ground together. Since the area that is processed is small, the flatness can be enhanced.

Thus, a cubic boron nitride cutting tool having a highly accurate center height can be provided. Moreover, processing of an edge becomes more flexible. Thus, the angle of inclination or the width of a negative rake face can be made sufficiently small in the case where the negative rake face is provided or not provided.

DESCRIPTION OF EMBODIMENTS

Figure 1A:
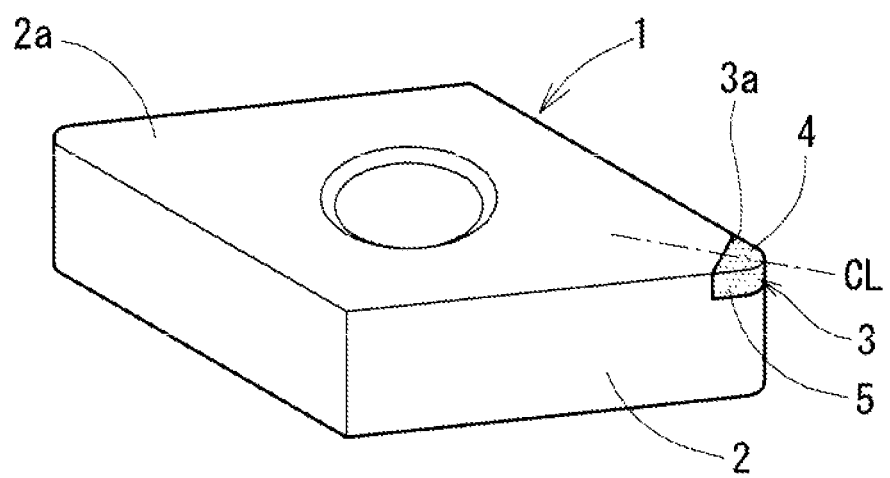
FIG. 1A is a perspective view of an example of a cubic boron nitride cutting tool obtained by grinding with a method according to the invention.
Figure 1B:
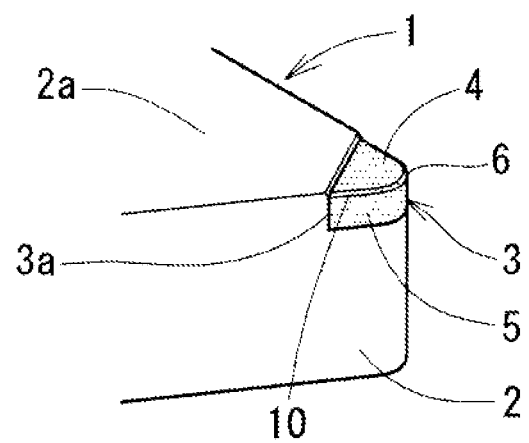
FIG. 1B is a perspective view of the appearance of the cubic boron nitride cutting tool of FIG. 1A after being ground.

Referring to the drawings, an embodiment of a method for manufacturing a cubic boron nitride cutting tool according to the invention is described below.

Figure 2A:
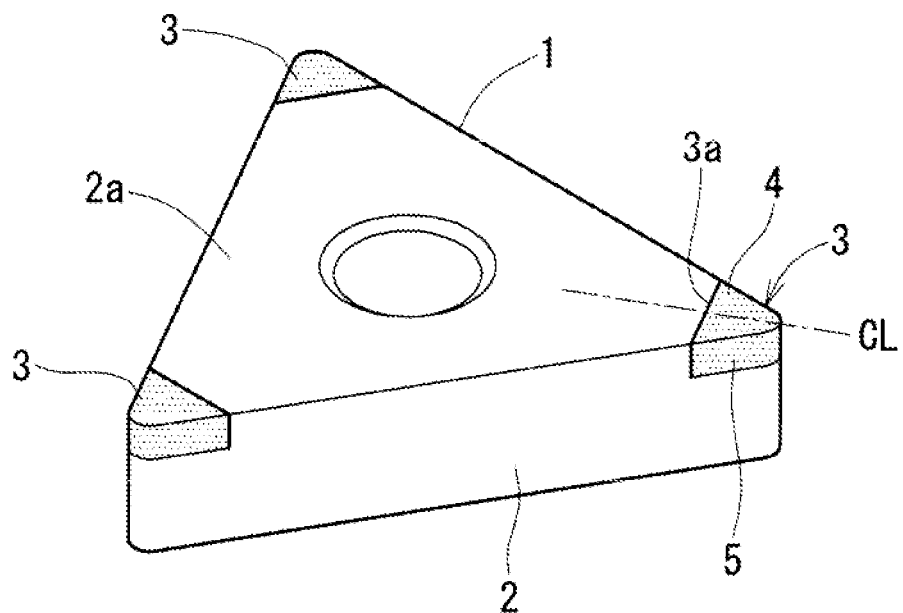
FIG. 2A is a perspective view of another example of a cubic boron nitride cutting tool obtained by grinding with a method according to the invention.
Figure 2B:
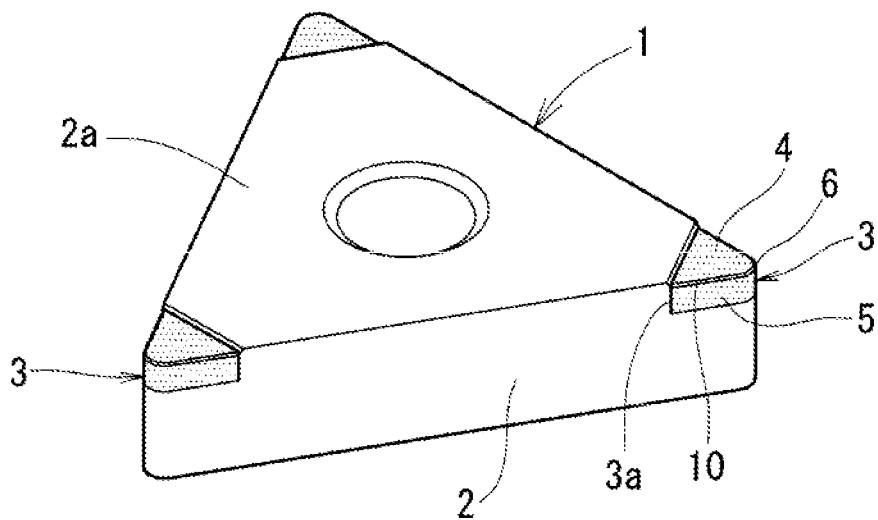
FIG. 2B is a perspective view of the appearance of the cubic boron nitride cutting tool of FIG. 2A after being ground.

FIGS. 1A and 2A illustrate examples of a cubic boron nitride cutting tool that is to be ground. A cubic boron nitride cutting tool 1 of FIG. 1A is a rhombic cutting insert obtained by joining a small piece of a sintered cubic boron nitride compact 3 onto a top face 2a of a base metal 2, made of a cemented carbide base metal, at an acute corner portion of the top face 2a. Other examples of such a rhombic cutting insert include a rhombic cutting insert obtained by disposing small pieces of sintered cubic boron nitride compacts 3 at two diagonally opposite acute corners.

A cubic boron nitride cutting tool 1 of FIG. 21 is a triangular cutting insert obtained by joining small pieces of sintered cubic boron nitride compacts 3 onto a top face 2a of a base metal 2, made of a cemented carbide base metal, at corner portions of the top face 2a. Other examples processible by the method according to the invention include a cutting insert that includes a sintered cubic boron nitride compact at only one corner, a cutting insert shaped differently from those illustrated (a rhombic having different corner angles or a polygonal having four or more corners), and a negative cutting insert obtained by joining sintered cubic boron nitride compacts onto the top and bottom surfaces of the base metal at corner portions of the top and bottom surfaces.

Each sintered cubic boron nitride compact 3 has a joint surface 3a that is perpendicular to the bisector CL of a corner at which the sintered cubic boron nitride compact 3 of the cubic boron nitride cutting tool 1 is disposed. The joint surface 3a receives the cutting thrust force.

The sintered cubic boron nitride compact 3 and the base metal 2 of the cemented carbide may be any object usable for a cutting tool and the amount of cubic boron nitride or tungsten contained in the object is not particularly limited.

The following description is given taking the cubic boron nitride cutting tool to rhombic cutting insert) of FIG. 1A as an example.

Figure 3:
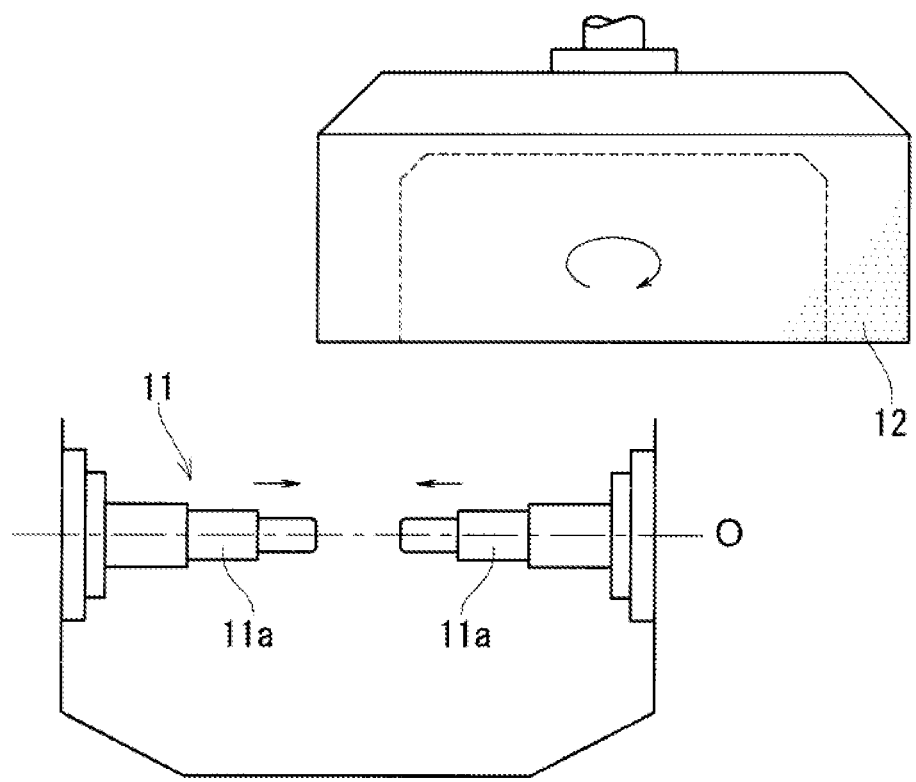
FIG. 3 is a plan view of a main portion of an example of a grinder used to perform a method according to the invention.

In this invention, grinding is performed using a numerically controlled (NC) grinder. The grinder that is used in grinding includes a chuck 11 as illustrated in FIG. 3 and whose position and orientation are numerically controlled and a grindstone 12 that rotates at a fixed position.

The delivery of a workpiece (cubic boron nitride cutting tool) to the grinder and the delivery of a workpiece to the chuck 11 are performed using a robot hand (not illustrated) whose position is controlled.

Here, the illustrated grindstone 12 is a cup grindstone but grinding using a disc-shaped grindstone is also possible. For the grindstone 12, a grindstone having a fine grit of #600 or larger is suitable.

Figure 4:
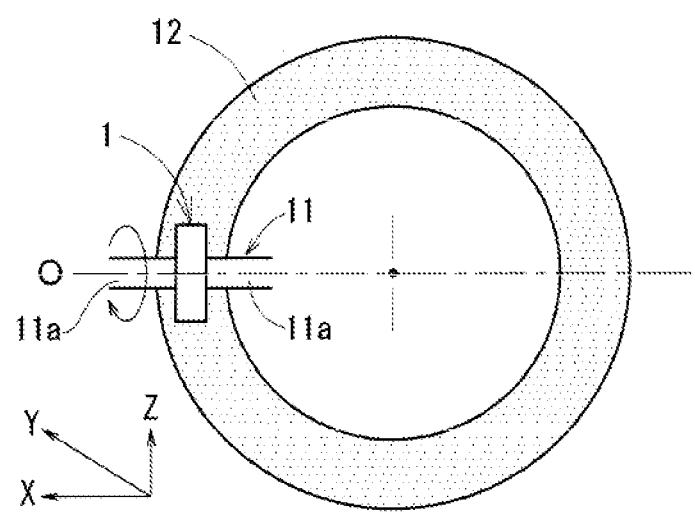
FIG. 4 is a front view illustrating the operation of a chuck of the grinder.
Figure 5:
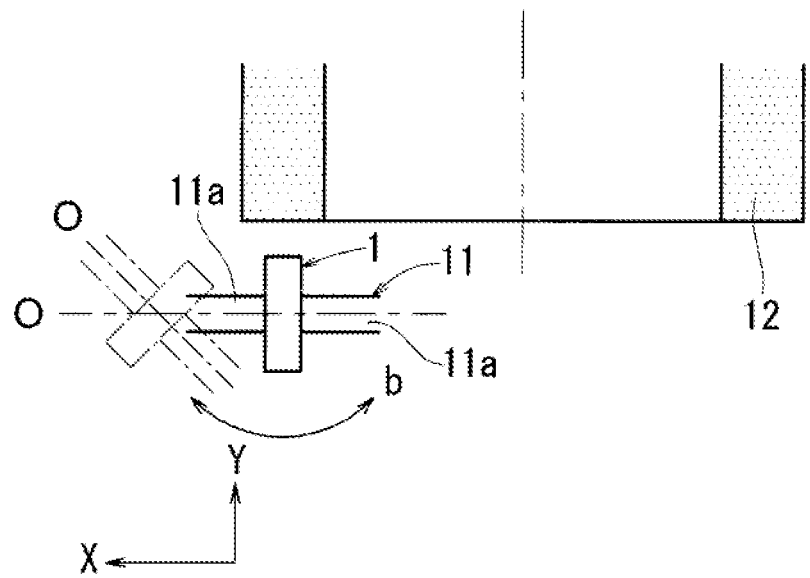
FIG. 5 is a plan view illustrating the operation of the chuck of the grinder.

A grinder used for evaluation of the method of this invention has a function of quadruple-axis control as illustrated in FIGS. 4 and 5, that is, the grinder has various functions (although not movable in the Z-axis direction) of moving the chuck in the X-axis and Y-axis directions, rotating the chuck 11 around the axis O, and rotating the chuck 11 in the b-axis direction illustrated in FIG. 5. Grinding was successfully performed by the manufacturing method of the invention using the grinder having a quadruple-axis control function.

The chuck 11 includes a pair of opposing plug gauges 11a, which are replaceable with those having different sizes. Using plug gauges appropriate for the model number of a cubic boron nitride cutting tool that is to be processed, the chuck 11 tightly holds a cubic boron nitride cutting tool 1, which has been delivered to a fixed position by a robot hand, in the direction of the thickness of the base metal 2 of the tool.

By controlling the position and orientation of the chuck 11, a flank face 5 and a rake face 4 are formed on a sintered cubic boron nitride compact joined at a corner of the base metal 2 by grinding the sintered cubic boron nitride compact 3 while the sintered cubic boron nitride compact 3 is pressed against the end surface of a rotating grindstone 12.

As to the order of grinding, the flank face 5 is firstly formed by grinding and then the rake face 4 is formed by grinding. This order is preferable because it is more effective for avoiding chipping at a ridge portion formed at a position between the rake face and the flank face than in the case where the rake face is formed by grinding, and the flank face is formed by grinding in this order.

During grinding to form the flank face 5, a portion of the surface that is being processed with which the grindstone comes into contact gradually changes. On the other hand, during grinding to form the rake face 4, the end surface of the grindstone comes into contact with the entire ground area so as to be parallel to the area. This operation is considered to be effective for avoiding chipping.

As illustrated in FIG. 4, in the grinding to form the flank face 5, the portion that is processed is gradually changed by rotating the chuck 11 around the axis O while the flank face 5 of the cubic boron nitride cutting tool 1 held by the chuck 11 is pressed against the end surface of the grindstone 12.

Figure 6:
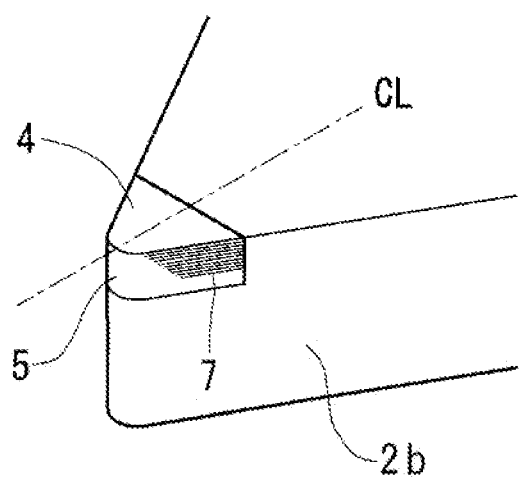
FIG. 6 is a perspective view illustrating grinding streaks on a flank face.

Consequently, grinding streaks 7 (see FIG. 6) perpendicular to the direction of the tool thickness are formed on the flank face 5. Here, the grinding streaks perpendicular to the direction of the tool thickness include, not only the grinding streaks that are perfectly perpendicular to the direction of the tool thickness, but also grinding streaks that extend in a direction that is more or less inclined with respect to the line perpendicular to the direction of the tool thickness within the range not impairing the economic efficiency or the workability.

The reason why the grinding streaks formed on the flank face and the rake face are perpendicular to the direction of the tool thickness is the cost saving for mass production. The grinding streaks may be formed so as to be inclined with respect to the line perpendicular to the direction of the tool thickness within the range within which the effects of the operation can be obtained.

Here, if the flank face 5 of the sintered cubic boron nitride compact 3 is flush with a side surface 2b of the base metal 2, the side surface of the base metal 2 is simultaneously ground. However, since the sintered cubic boron nitride compact 3 does not have a large thickness, this grinding does not cause significant edge dullness on the flank face. In the case where the flank face 5 protrudes from the side surface 2b of the base metal 2, only the flank face 5 is formed by grinding in this step.

Figure 7:
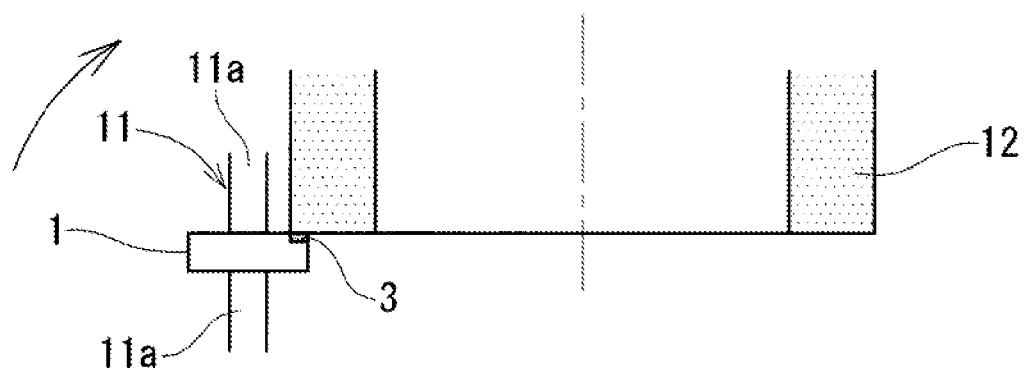
FIG. 7 illustrates the state of the rake face that is being ground.

Subsequently, the rake face 4 is formed by grinding. The grinding is performed without changing the chuck 11 that holds the cubic boron nitride cutting tool 1 to another chuck. The chuck 11 holding, the cubic boron nitride cutting tool 1 is rotated in the b-axis direction of FIG. 5 and the rake face of the sintered cubic boron nitride compact 3 is pressed against the end surface of the grindstone 12 so as to be parallel to the end surface, as illustrated in FIG. 7.

Here, when the cutting tool is pressed against the grindstone 12 in such a manner that only the sintered cubic boron nitride compact 3 is ground, simultaneous grinding of two materials having different hardness is not performed. In addition, the area that is ground is reduced and thus the surface of the grindstone that is appropriately dressed and that has excellent sharpness can be used. In addition, the finished tool has an excellent appearance. In the case where the top face of the sintered cubic boron nitride compact 3 protrudes from the top face of the base metal 2 (base-metal rake face), it is easy to grind only the sintered cubic boron nitride compact 3.

However, as long as the area over which the compact and the base metal are ground simultaneously is within the range that is not adversely affected by the simultaneous grinding, part of the base metal may be ground simultaneously with the sintered cubic boron nitride compact to form the rake face. In the situation where the edge of the grinding surface cuts into the base metal 2 by, for example, approximately 2 mm, grinding the base metal and the compact simultaneously does not cause any harm, whereby the flatness of the rake face is not impaired.

Figure 8:
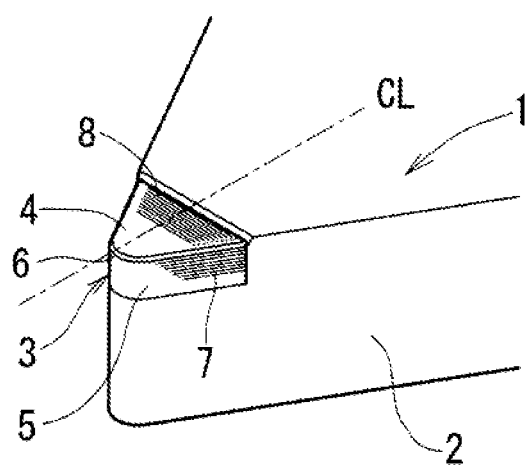
FIG. 8 is a perspective view of the grinding streaks on the rake face.

As illustrated in FIG. 8, the rake face 4 is formed by grinding in such a manner as to form grinding streaks 8 that are approximately perpendicular to the bisector CL of the corner of the tool at which the sintered cubic boron nitride compact 3 is disposed.

When the rake face is pressed against the end surface of the rotating grindstone, the grinding streaks formed on the rake face are arcuate, not straight, in the strict sense. Thus, the grinding streaks 8 here are expressed as being "grinding streaks that are approximately perpendicular to the bisector CL of the corner".

Figure 9:
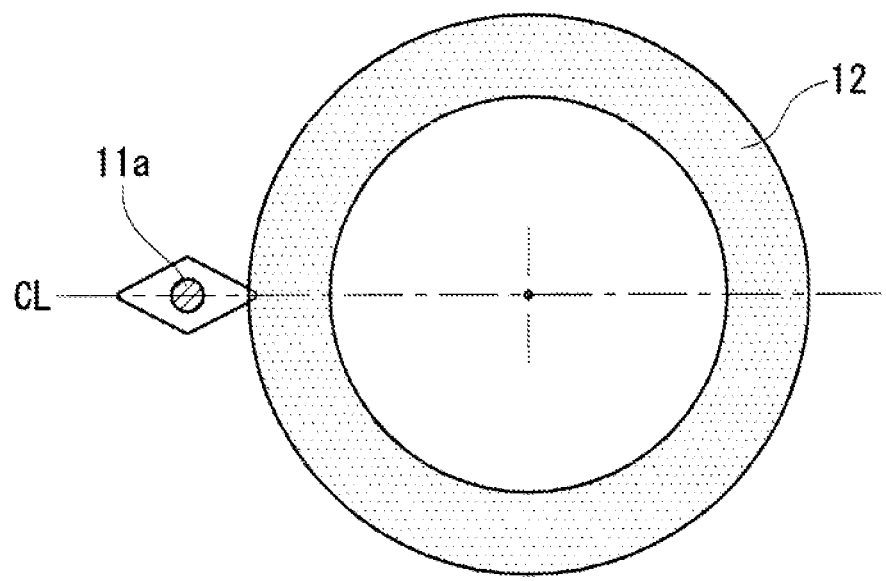
FIG. 9 is a front view illustrating the state of the rake face that is being ground.
Figure 13:
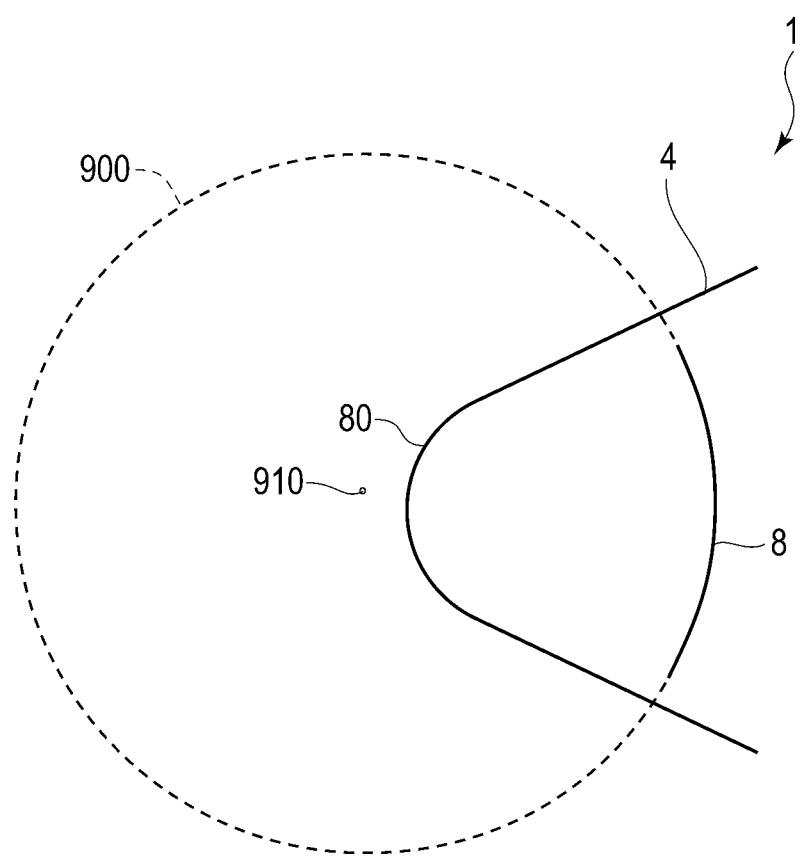
FIG. 13 shows an arcuate grinding streak on the rake face.

As illustrated in FIG. 9, when the compact is ground while being in such a position that the bisector CL of the corner is aligned with an imaginary straight line extending radially from the rotation center of the grindstone 12, the grinding streaks 8 shaped in arc having the center at the rotation center of the grindstone 12 are formed on the rake face. Thus, when viewed in a direction perpendicular to the rake face 4, each grinding streak 8 is shaped as a portion of an imaginary circle 900 corresponding to the circle of the grindstone 12 in FIG. 9. See FIG. 13. The center 910 of the imaginary circle corresponds to the center of the grindstone 12, is away from the corner 80 of the cutting tool 1 in plan view, and does not overlap with the cutting tool 1. See FIG. 9.

Grindstones having the radius within the range of approximately 50 mm to 300 mm have been widely used as examples of the grindstone 12. In the case where a grindstone having a radius of 300 mm is used, the grinding streaks 8 have an R radius of approximately 300 mm. Since the cubic boron nitride cutting tool is not so large, the grinding streaks 8 appear to be streaks that are approximately straight lines.

In the case where the flank face 5 and the rake face 4 are formed by grinding using the end surface of the same grindstone, the ratio of the surface roughness of the flank face 5 to the surface roughness of the rake face 4 is almost one.

Figure 10:
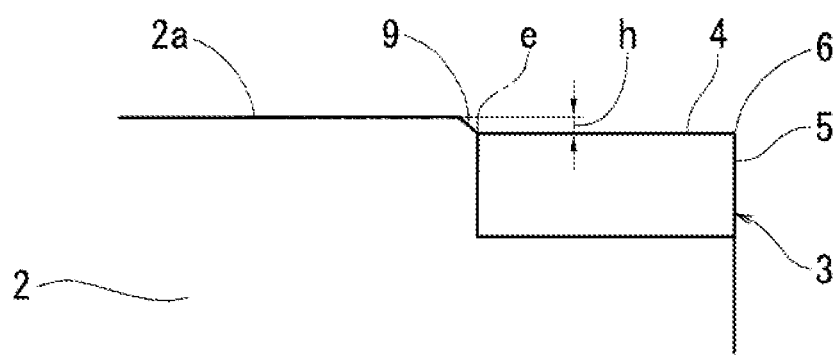
FIG. 10 is an enlarged side view of a step over the rake face.

In the case where the base-metal top face (base-metal rake face) and the top face of the sintered cubic boron nitride compact are flush with each other before being ground, the rake face 4 is recessed from the top face 2a of the base metal (in the case of a negative cutting tool in which the top and bottom faces have the same structure, the bottom face is also regarded as a top face) so that a step h having a height of preferably 0.1 mm or smaller is formed between the top face 2a of the base metal and the rake face 4, as illustrated in FIG. 10.

When the step h is formed, an edge e indicated by a dotted line in FIG. 10 is formed at the border between the ground surface of the base metal 2 and the compact. Since the edge e is useless, the edge e is preferably removed by forming a chamfered portion 9 (see FIG. 10). The chamfered portion 9 can be formed subsequently to the grinding to form the rake face 4 by rotating the chuck 11 in the direction of the arrow of FIG. 7 (clockwise in FIG. 7) from the position in FIG. 7.

The invention is also applicable to the case where a tool obtained by soldering a cubic boron nitride blank to a ground top face of the base metal (the case where the rake face of the base metal and the cubic boron nitride blank are not flush with each other) are to be ground. In the case where the top face of the sintered cubic boron nitride compact protrudes from the top face of the base metal before being ground, only the protruding portion of the sintered cubic boron nitride compact has to be ground.

In the case where the flank face 5 and the rake face 4 are formed by grinding using the end face of the same grindstone, the ratio of the surface roughness of the flank face 5 to the surface roughness of the rake face 4 is approximately one.

Figure 11:
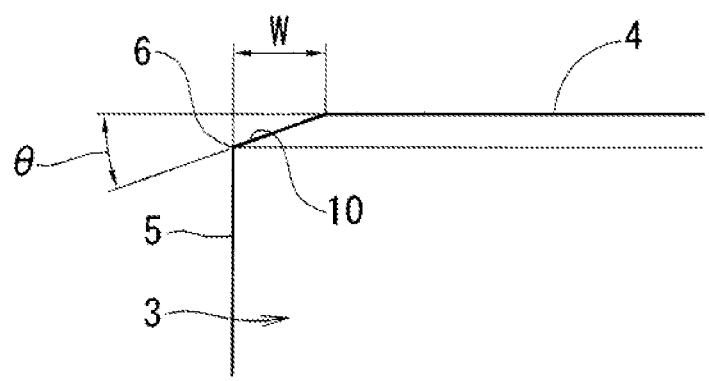
FIG. 11 is an enlarged side view of the negative rake face of the edge portion.

In the case where the cutting edge needs to have a negative rake face, a negative rake face 10 (see FIG. 11) is formed, after the flank face 5 and the rake face 4 are formed by grinding, along the cutting edge 6 formed by a ridge at which the flank face 5 and the rake face 4 meet. The axis O of the chuck 11 is inclined as illustrated by the dotted lines of FIG. 5. At this state, a portion at which the negative rake face is formed is brought into contact with the end face of the grindstone 12 and the chuck 11 is moved so that the contact point is moved in the longitudinal direction of the cutting edge. Thus, the negative rake face 10 can be formed.

In this invention, the above-described grinding is performed using a so-called single chuck while the chuck 11 keeps holding the tool.

Figure 12:
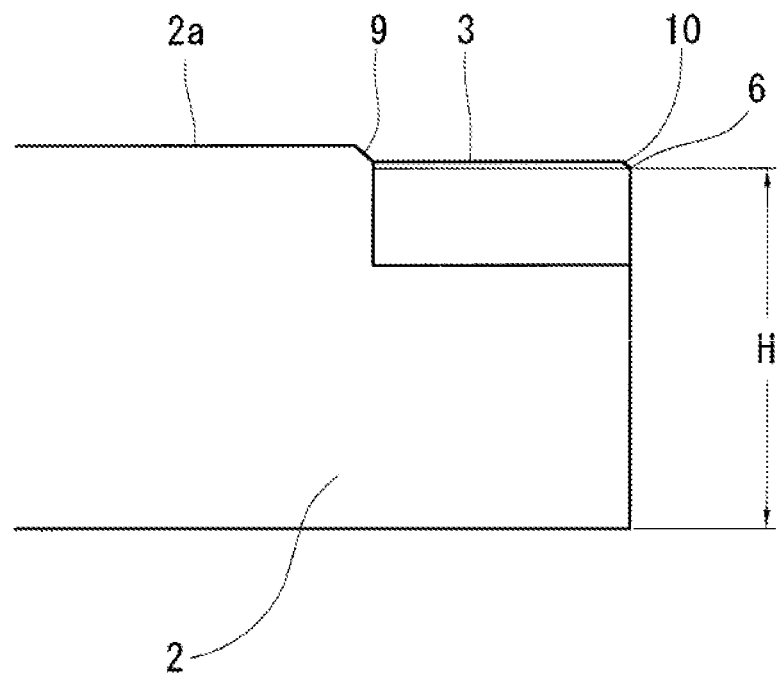
FIG. 12 is a side view illustrating the center height.

This operation prevents positional displacement of the tool that would otherwise occur due to changing the chuck that holds the tool to another. In addition, by grinding to form the rake face without the base metal being ground simultaneously, the rake face is prevented from being edge-dulled, whereby the accuracy of the center height H (see FIG. 12, which is the height from the bottom surface at which the tool is supported to the processed point) can be improved to a large extent.

Preventing the rake face from being edge-dulled enables reduction of the angle of inclination θ and the nominal width W (see FIG. 11) of the negative rake face 10 compared to those in the existing tool (enables optimization of the site of the negative rake face of a finishing tool or the like). Consequently, the nominal width W varies to a smaller extent, whereby the accuracy of the center height or the sharpness can be further improved.

In an experimental tool for a mass-produced product formed by performing grinding using a cup grindstone of #1400, the tolerance of the center height H successively fell within ±10 μm, the angle of inclination θ of the negative rake face successively fell within 15°, the tolerance of the nominal width successively fell within ±10 μm when the nominal width W of the negative rake face was 0.1 mm (100 μm). Moreover, processing the negative rake face having an angle of inclination θ of 5°, which had been impracticable, was successively performed. Here, the flank face had grinding streaks perpendicular to the direction of the tool thickness, the rake face had grinding streaks approximately perpendicular to the bisector of the corner of the tool at which the sintered cubic boron nitride compact is disposed, and the rake face was formed so as to be recessed from the top face of the base metal so that a step is formed between the rake face and the top face of the base metal.

As described above, the method described above enables manufacture of a cubic boron nitride cutting tool having a highly accurate center height. This eliminates the need for tentative grinding for adjustment of the center height when a mass-produced tool is used, which is highly beneficial to users of the tool. Although the method illustrated as an example is a method for easily manufacturing a tool using typical equipment for grinding the periphery, the processing method is not limited to this as long as the method has the same operational effects.

The description has been given taking grinding to form the flank face and the rake face in this order as an example. However, even in the case where the rake face is formed by grinding first and then the flank face is formed by grinding, the accuracy of the center height and the accuracy of the negative rake face are improved compared to those in the case of an existing tool, since it is effective to perform grinding using a single chuck and to perform grinding to form the rake face in such a manner that a sintered cubic boron nitride compact is substantially ground.

The invention is also applicable to the case where a tool obtained by soldering a cubic boron nitride blank to a ground top face of the base metal (where the base-metal rake face and the cubic boron nitride blank are not flush with each other) are to be ground.

The structure of the disclosed embodiment of the invention is a mere example and the scope of the invention is not limited to the range described in the embodiment. The scope of the invention is defined by the scope of Claims and also includes the equivalent of the scope of Claims and all the modifications within the scope.

REFERENCE SIGNS LIST 1 cubic boron nitride cutting tool
2 base metal
2a top face
2b side surface
3 sintered cubic boron nitride compact
3a joint surface
4 rake face
5 flank face
6 cutting edge
7 grinding streak on flank face
8 grinding streak on rake face
9 chamfered portion
10 negative rake face
11 chuck
11a plug gauge
12 grindstone
CL bisector of corner of cubic boron nitride cutting tool at which sintered cubic boron nitride compact is disposed
O axis of chuck
b direction of rotation of chuck
h step between base-metal top face and rake face
e edge
θ angle of inclination of negative rake face
W nominal width of negative rake face
H center height

The invention claimed is:

1. A cubic boron nitride cutting tool comprising a cemented carbide base metal and a sintered cubic boron nitride compact at a corner portion of the cemented carbide base metal, the compact having a flank face and a rake face,
   wherein the flank face has grinding streaks, the rake face has grinding streaks that are arcuate and are approximately perpendicular to a bisector of a corner of the tool at which the sintered cubic boron nitride compact is disposed,
   when viewed in a direction perpendicular to the rake face, each grinding streak on the rake face is shaped as a portion of an imaginary circle having a center that does not overlap with the tool,
   wherein a ratio of a surface roughness of the flank face having the grinding streaks to a surface roughness of the rake face having the grinding streaks is almost one,
   the rake face is formed so as to be recessed from a top face of the base metal so that a step is formed between the rake face and the top face of the base metal,
   the rake face is flat except for the grinding streaks and is parallel with the top face, and
   the base metal has a chamfered portion formed from the top face toward the rake face, the chamfered portion extends across the bisection of the corner and is tilted against both the rake face and the top face.

2. The cubic boron nitride cutting tool according to claim 1, further comprising a negative rake face extending along a cutting edge formed by a ridge at which the flank face and the rake face meet and an angle of inclination of the negative rake face is 15° or smaller.

3. The cubic boron nitride cutting tool according to claim 1, wherein the rake face has a roughness the same as a roughness of a grindstone having a fine grit of #600 or larger.

4. The cubic boron nitride cutting tool according to claim 1, wherein the step has a height of 0.1 mm or less.

* * * * *